United States Patent [19]

Junichi et al.

[11] Patent Number: 5,176,429
[45] Date of Patent: Jan. 5, 1993

[54] FAILURE DETECTION CIRCUIT FOR ANTI-SKID BRAKING SYSTEM

[75] Inventors: Kaneko Junichi; Toshihiro Hamada, both of Shizuoka, Japan

[73] Assignee: Nissinbo Industries, Inc., Tokyo, Japan

[21] Appl. No.: 621,459

[22] Filed: Nov. 29, 1990

[30] Foreign Application Priority Data

Dec. 1, 1989 [JP] Japan .................. 1-310593

[51] Int. Cl.⁵ .................................. B60T 17/22
[52] U.S. Cl. .................................. 303/92; 303/20
[58] Field of Search .................. 303/92, 100; 364/426.03

[56] References Cited

U.S. PATENT DOCUMENTS

| | | | |
|---|---|---|---|
| 3,709,567 | 1/1973 | Van Ostrom et al. | 303/92 |
| 3,874,743 | 4/1975 | Fleischer et al. | 303/92 |
| 3,891,279 | 6/1975 | Frait | 303/92 |
| 4,106,820 | 8/1978 | Ruhnau et al. | 303/92 |
| 4,113,321 | 9/1978 | Bleckmann | 303/92 |
| 4,661,910 | 4/1987 | Reinecke et al. | 364/424.03 |
| 4,745,542 | 5/1988 | Baba et al. | 303/92 |

FOREIGN PATENT DOCUMENTS

| | | | |
|---|---|---|---|
| 0075931 | 4/1983 | European Pat. Off. | 303/92 |
| 0125660 | 11/1984 | European Pat. Off. | 303/92 |

*Primary Examiner*—Matthew C. Graham
*Attorney, Agent, or Firm*—Morrison & Foerster

[57] ABSTRACT

An improved failure detection circuit for anti-skid braking systems is disclosed. The failure detection circuit sends electrical test pulses to the individual valves which control the flow of pressurized brake fluid to the individual brakes and uses a feedback signal from these valves to determine a failure in any of these circuits. The failure detection circuit also includes a voltage monitoring circuit which monitors the voltage which is supplied to the anti-skid braking controller while applying an electrical load to the main power circuit for the controller such as by testing a plurality of valves at once. If the voltage drops below a minimum acceptable level, it indicates an actual or incipient failure of the main power supply circuit. This indication can be used to trigger a warning or to shut down the anti-skid braking system as can a detection of a failure in an individual circuit.

1 Claim, 4 Drawing Sheets

FAILURE DETECTION CIRCUIT FOR ANTI-SKID BRAKING SYSTEM

BACKGROUND OF THE INVENTION

1. Cross-Reference

The present application is the United States counterpart of earlier-filed Japanese patent application no. 1-310593, filed Dec. 1, 1989, which application is incorporated herein by reference and to which application applicants claim priority under 35 USC §119.

2. Field of the Invention

The present invention relates generally to the field of anti-skid braking systems. More particularly, it relates to failure detection circuits for use in such systems.

3. Background Art

Various anti-skid control devices have been developed to prevent the wheels of a vehicle from locking or skidding during braking. In general terms, these devices function by controllably modulating the amount of braking action (via modulating brake fluid pressure) at each of the four wheels by using valves and electronic control means.

An anti-skid control device generally consists of wheel speed detecting means located at each of the wheels, a computational arithmetic means capable of calculating the slip ratio based on the wheel speed and acceleration, and a control means to control (modulate) the amount of brake fluid pressure applied to each of the wheel brakes based on the output signal from the computational arithmetic means. Such devices are capable of facilitating the deceleration of a vehicle while regulating the wheel deceleration speed within an appropriate slip angle ratio by controlling the braking pressure according to the slip conditions of the wheel. When functioning properly, the presence of an anti-skid braking system is generally indetectable to the driver. That is, the driver is unaware that the anti-skid braking system is present. Anti-skid braking systems have substantial advantages in preventing wheel skid and allowing the application of brakes during turning motions and on surfaces of variable coefficient of friction. It is very important that a driver be informed if there is an inadvertent failure in the anti-skid braking system. Although, typically, the failure of the anti-skid system will lead to normal (no anti-skid) braking action, the advantages and safety margin provided by the anti-skid system will be missing. Thus it is important that the driver be alerted to the failure of the anti-skid system. It is known in the art to provide anti-skid braking systems with a failure detection circuit to send a signal to the driver and, at the same time, cause the anti-skid braking system to revert to a normal braking system.

Typical failure detection circuits used in the past comprise a voltage monitoring circuit monitoring the integrity of the electronic functions in the anti-skid braking system, a physical failure detection circuit monitoring the physical integrity of the pressurized brake fluid control circuit, electromagnetic valves, etc., a main power source circuit breaker which shuts down the system in case of a failure, and a means for providing a warning if any of these systems detects a failure. Two power feed circuits are ideally required for the means for warning. This redundancy allows the means for warning to continue to send a warning signal even if the failure that the system has detected has occurred in the primary electrical power feed to the detection system.

Although these background systems are well understood, there are a number of disadvantages inherent in them. These inadequacies of prior systems include:

(1) When a failure occurs in the main power source circuit breaker or in the main power source circuit, current from the vehicle will be permitted to flow to the warning circuit through the remainder of the two above-mentioned power feed circuits. Accordingly, the failure in the main power source breaker or the main power source circuit would be difficult to diagnose and correct.

(2) When a failure occurs in the main power source circuit breaker or the main power source circuit itself, in conventional systems this will lead to an increase in consumption of electric current, but since the failure is in the main power source circuit breaker or in the main power source circuit itself, this increase in current may not be detected if the available current is not overtaken by demand and no voltage drop occurs.

(3) The above two problems can be solved by installing a separate dedicated failure-detecting device to detect specifically a failure in the main power source breaker and main power supply circuit. However, such a device requires intricate circuit structure and can lead to high manufacturing costs.

STATEMENT OF THE INVENTION

It is an object of this invention to solve these problems presented by systems of the prior art.

It is a primary object of this invention to provide a failure detection circuit for use with anti-skid braking systems which can accurately detect a failure in the main power source breaker or the main power source at an early stage. Such failures in the main power source or the main power source breaker may not necessarily be in the form of a complete breakdown but may be in the form of degradation of these circuits such as degradation in insulation value, voltage loss, or a general gradual breakdown.

It is another object of this invention to provide a failure detection circuit for an anti-skid braking system which can detect a failure in the anti-skid braking system under any conditions.

It is of course a general object of this invention to provide a failure detection circuit which will lead to improved anti-skid braking systems and thus to provide improved safe driving.

The present invention is an improvement in failure detection circuits for anti-skid braking systems for vehicles. These anti-skid braking systems include means for controlling the pressure of brake fluid applied to individual brakes of a vehicle according to the rotational behavior of the wheels of the vehicle, a logic circuit for controlling the means for controlling the pressurized brake fluid, and a failure detection circuit which can detect a failure in the anti-skid braking system by using a feedback signal of test pulses which are generated individually by the logic circuit and sent to the individual valves which control the flow of pressurized brake fluid to the individual brakes. The failure detection circuit also includes a voltage monitoring circuit which monitors the voltage which is supplied to the means for controlling the pressurized brake fluid, a main power source circuit breaker to interrupt the power source if there has been a detection of a voltage drop by the voltage monitoring circuit, and a means for warning the driver that a failure has occurred and been detected. In this sort of failure detection system the improved circuit is characterized in that in addition to testing the individual valve circuits with individual electrical test pulses, a second test is carried out by applying an electrical load to the main power circuit while monitoring the voltage level with the voltage monitoring circuit. If the voltage drops below a minimum acceptable level under these conditions, it indicates an actual or incipient failure in the power supply circuit or power supply breaker, which indication can be used to trigger a warning and or shut down the anti-skid system. In one preferred embodiment, this load is placed on the main power system by supplying simultaneously a plurality of electrical test pulses to a plurality of all of the electromechanical valves of the means for controlling the pressurized brake fluid. Each of the electromechanical valves imposes an electrical load on the main power source circuit. Thus, when multiple valve loads are imposed, they sum such that the voltage of the main power source circuit will drop to below the activation limit of the low voltage detector in the in the voltage monitoring circuit if a failure has occurred in the main power source circuit.

In another embodiment of this invention, the low voltage condition which arises and is detected as a result of a failure in the main power source circuit is imposed by pulsing the warning device which informs the driver of failure for a short period. This period is long enough to cause a voltage drop because of the load imposed by the warning device, but short enough to not actually provide a driver-noticeable signal from the warning device. In this embodiment, the load imposed by the warning device is such as to bring about the low voltage condition which can be detected.

In yet an additional embodiment, instead of using the load imposed by the simultaneous polling of a plurality of individual valves for failure as the load to bring the test circuit voltage down to a level at which a failure in the main power circuit will lower the voltage to a point below the trigger point of the low voltage detector, a pre-set consuming circuit load is imposed to do the initial lowering of the voltage and create the electrical condition under which the main power circuit is tested.

This invention has the advantages that it permits one to detect failures not only in the individual valve circuits but also in the main power source circuit and/or the main power source circuit breaker at an early stage.

These and other advantages and features of the present invention will become apparent to those persons skilled in the art upon reading the details of the structure, operation and usage of the present failure detection system. Reference being made to the accompanying drawings forming a part hereof wherein like numerals refer to like components throughout.

BRIEF DESCRIPTION OF THE DRAWINGS

The present invention may be better understood and its numerous objects and advantages will become apparent to those skilled in the art by reference to the accompanying drawings as follows.

DETAILED DESCRIPTION OF THE PREFERRED EMBODIMENTS

Before the present anti-skid device failure detection circuit and its operation are described, it is to be understood that this invention is not limited to the particular structural components and means of operation described as such components and means of operation may, of course, vary. It is also to understood that the terminology used herein is for the purpose of describing particular embodiments only, and it is not intended to be limiting as the scope of the invention will be limited only by the appended claims.

Unless otherwise defined, all technical and scientific terms used herein have the same meaning as commonly understood by one of ordinary skill in the art to which the present devices belong. Although a number of different mechanical and electromechanical components similar to those described herein can be interchangeably used with those described herein, the preferred components and their relationships are now described.

(1) Description of Anti-Skid Braking Systems

Figure 1:
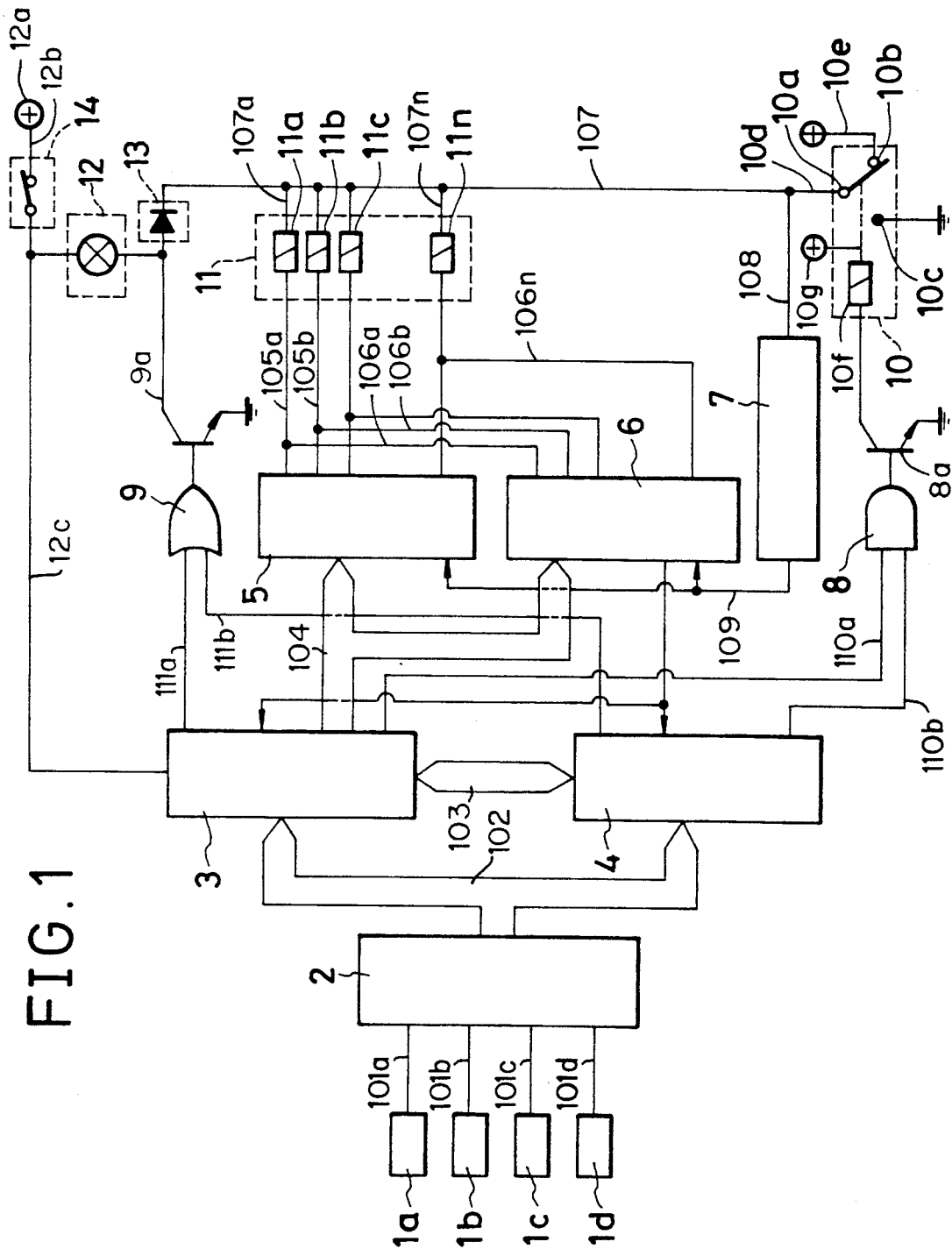
FIG. 1 is a block diagram of an anti-skid braking system which includes a failure detection circuit of the present invention.

FIG. 1 shows in block diagram form an anti-skid braking system which includes a failure detection circuit of the present invention. This circuit begins with sensors 1A, 1B, 1C and 1D which detect the rotational speed of the individual wheels of the vehicle upon which the anti-skid braking system is mounted. These sensors are provided near the respective four wheels. The signals generated by these sensors is sent through lines 101A . . . 101D to a computing circuit 2 which computes the rotational speed of the wheels from the signals sent by the sensors 1A . . . 1D. The rotational speed information calculated in computer 2 is sent through buss 102 to logic circuits 3 and 4 which compare the speeds of the respective four wheels and assemble other necessary data such as information on whether the brake pedal is depressed, brake lights are on, etc. Logic circuits 3 and 4 are interconnected by buss 103 and thus monitor each other. Logic circuit 3 generates a series of anti-skid brake control signals which can be used to modulate the openings of individual valves in the brake system to control the braking effect on individual wheels based on the information sent to it from computing circuit 2. These brake control signals are sent through buss 104 to amplifier 5 which amplifies the output signal from logic circuit 3 and sends it via lines 105A, 105B . . . 105N to electromechanical control means (e.g., solenoid valves) 11A, 11B . . . 11N which are each located at individual brakes on the car. The signals to these electromechanical valves bring about the anti-skid performance in that they serve to release brake pressure in response to pending wheel lock sensed by sensors 1A, 1B, etc. The solenoid valves are merely representative and any other electromechanical means of controlling the pressurized brake fluid at the individual wheels may also be used.

In this system, failure detection is important. One type of failure to be detected is failure in the individual electrical circuits which control the braking at individual wheels. This type of failure is a failure for example in line 105A or control means 11A. This failure could be in the form of a physical break in an electrical circuit. It could also be in the form of degradation of the properties of this circuit so that it is not performing at top efficiency. Such degradation could include electrical degradation such as broken insulation, increased resistance at a contact, or the like. Individual lines 106A . . . 106N run from the individual brake circuits to failure detection circuit 6. Item 7 is a voltage monitoring circuit which connects to main power line 107 through line 108. Main power line 107 draws power through line 10E, thence through circuit breaker 10 to contact 10B, 10A and line 10D, and supplies this power through lines 107A . . . 107N to the control means 11A . . . 11N. Thus, these control means have one half of their circuit completed by line 107 etc., and are activated when amplifier 10 completes the circuit via lines 105A . . . 105N. In conventional systems, low voltage detector 7 is arranged to detect the low voltage of the main power source circuit when the voltage drops under a fixed level. When the voltage monitoring circuit 7 detects this low voltage in the main power source circuit the voltage monitoring circuit 7 sends a stop signal to amplifier 5 via line 109. Amplifier 5 in turn uses this signal to control the control means 11A . . . 11N. Low voltage monitoring circuit 7 also sends this same signal to failure detection circuit 6. The circuit breaker in the main power source 10 is controlled by AND gate 8. OR gate 9 is the control for warning means (light, buzzer, etc.) 12. The drive circuit for AND gate 8 (which controls the main circuit breaker) and OR gate 9 (which controls the warning device) are controlled by logic circuits 3 and 4 via lines 110A and 110B, in the case of gate 8, and lines 111A and 111B in the case of gate 9.

The circuit breaker for the main power supply is referred to as 10. Circuit breaker 10 includes a drive mechanism such as solenoid 10F. Normally, solenoid 10F is in a position such that contact 10A is bridged to contact 10B and that power coming from main power line 10E can flow to controls 11. Solenoid 10F is supplied with power from power source 10G. The circuit to activate solenoid 10F is completed when ground is supplied to the solenoid via line 110. This occurs if end-gate 8 is activated by lines 110A and 110B. In this embodiment one half the activation circuit for relay switch 10F is connected to the main power source 10G and the other part of the activator for switch 10F is connected to gate 8 which controls ground source 8A. Main power source circuit breaker 10 includes a terminal 10A which is connected to the pressurized brake fluid control means via line 107, a terminal 110B which is connected to the main power source, and a ground terminal 10C. When the main power source circuit breaker 10 is in normal operation it is in the configuration shown in FIG. 1 such that the connection is made between terminals 10A and 10B. When a signal is sent via lines 110A and 110B to gate 8 indicating that there has been a failure in the main power source breaker or the like relay switch (solenoid) 10F receives ground via line 110 and it activates, disconnecting terminal 10A from terminal 10B and reconnecting terminal 10A to terminal 10C.

This has the effect of causing all of valves 11A through 11N to go to their full open position and thus shut down the anti-skid braking system. Each of valves 11A through 11N are connected in parallel to amplifier 5 and to failure detection circuit 6. These valves 11A through 11N operate under the control of logic circuit 3 through its connection through amplifier 5. Item 12 is the means for warning which can be selected from lamps, buzzers and the like. Current control means 13 is a diode which controls the flow of electric current such that no current flows through the diode to valves 11A through 11N. Warning device 12 receives power from power source 12A and line 12B and ignition switch 14. This switched power source also feeds logic circuit 3 via line 12C. Warning means 12 is activated when ground is supplied through line 9A which is controlled by a drive circuit which includes OR gate 9. Line 9A is also connected through diode 13 to main power breaker 10 at contact 10A to make the redundant circuit.

(2) Principles for Failure Detection

Figure 2:
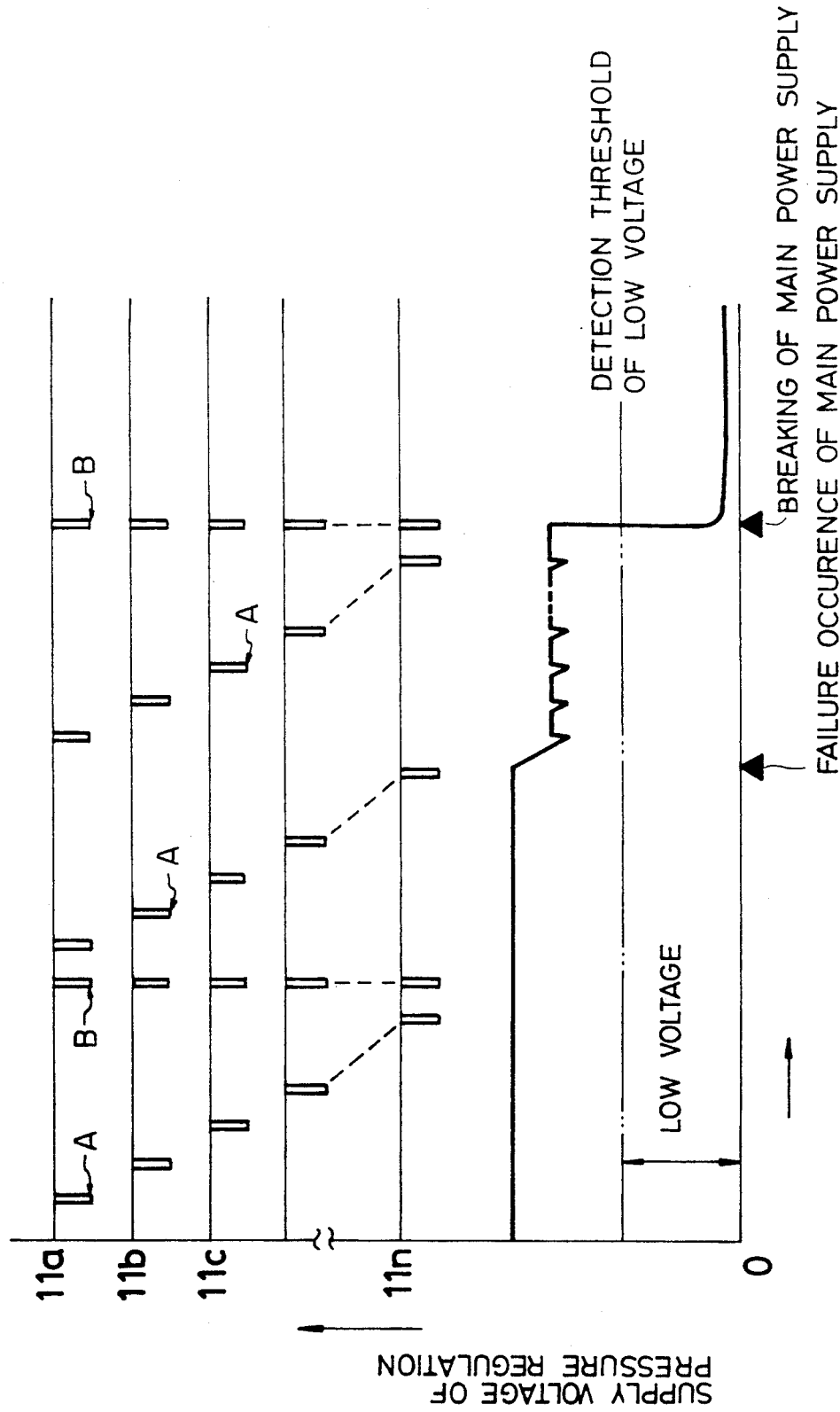
FIG. 2 is a timing diagram graphing the relationship between test pulses and the voltage observed in the main power source circuit in an anti-skid braking system which includes a failure detection circuit of the present invention.

In accord with the teachings of this invention electrical current test pulses are supplied from logic circuit 3 and amplifier 5 to the respective electromagnetic valves 11A . . . 11N. These test pulses are very brief in duration, so brief as to not actuate valves 11A . . . 11N, but long enough to load the electrical circuits going to these valves and produce a signal characteristic in terms of load and the like of an intact (nonfailed) electromagnetic valve circuit. This signal is picked up via lines 106A . . . 106N and fed to failure detection circuit 6. As shown in FIG. 2, one of the type of test pulses sent is single test pulses A which are supplied in regular succession to each of the valves. In addition to this mode of testing, a series of simultaneous pulses (synchro test pulse B) may be sent to all of the valves simultaneously.

As previously noted, the individual sequential pulses test individual valve circuits. When each of the valves receives a pulse, each of them has a given current draw which causes a voltage drop in the circuit feeding line. If all of the valves are tested simultaneously these draws become additive. This leads to a larger voltage drop in the main power source line 107. Voltage monitoring circuit 7 connected to line 107 through line 108 monitors this voltage drop. If the main power source and main power source circuit breaker 10 are in top condition the power supplied to line 107 will be such that voltage monitoring circuit 7 will detect a voltage during the voltage drop condition which remains above the desired threshold value. If, however, there is a failure or degradation of the main power source or main power source breaker the voltage and/or current supplied to line 107 will be reduced and the voltage drop that will occur when all of the valves are simultaneously tested will be so great as to cause the voltage to drop below the threshold level. Voltage monitoring circuit 7 detects this drop below the threshold level and gives an indication that failure has occurred. The signal the failure has occurred passes through line 109 to failure detection circuit 6 and amplifier 5. Failure detection circuit 6 in turn sends a signal to logic circuit 4 and logic circuit 3 which then cause main power breaker 10 to shut off and warning means 12 to give an alarm.

In the embodiment shown the synchro test simultaneously tests all N valves. This is not necessarily necessary. Some lesser number, but greater than a single valve, could be used so long as the voltage drop observed during that synchro test is great enough to trip the voltage monitoring circuit to indicate a low voltage during failure conditions in the main power source circuit.

The length of the test pulses for individual test pulses A and simultaneous pulses B is selected to be longer than the noise present in the hydraulic control circuits driving valves 11A . . . 11N. The maximum pulse should be selected so as to not allow the control valves to actuate so as to not impart any influence on the flow of fluid. Accordingly, representative pulse periods range from between about 100 microseconds to about 500 microseconds. It will be appreciated that the simultaneous test (simultaneous test pulses B) should be delivered at a time different from the individual pulses so as to not be confused with them.

OPERATION OF THE TEST CIRCUIT

(1) Testing of the Circuits when No Failure is Noted

FIG. 2 shows a timing diagram in which a graph of the individual pulses (type A) and simultaneous pulses (type B) are noted and the resulting voltage level observed by voltage monitoring circuit 7 is given. When each of the 11A . . . 11N control circuits are operating normally failure detector circuit 6 does not note any failure. Similarly, contacts 10A and 10B in the main power source circuit breaker remain connected to the main power source. This means that electric current is supplied to valves 11A–11N. When the simultaneous test pulse occurs this also causes no change in condition as voltage monitoring circuit 7 does not detect a low voltage condition. Accordingly, the output of test pulses A and B does not influence the failure detection circuit in such a way as to give rise to an indication that failure has occurred and simultaneous shutdown of the anti-skid braking system.

(2) Testing of the Circuits When Failure Occurs in a Valve Circuit

When a failure occurs in one of the valve circuits 11A . . . 11N, according to a feedback signal noted following a single test pulse A supplied to that circuit, failure detection circuit 6 detects this failure and outputs a detection signal to logic circuits 3 and 4. Logic circuits 3 and 4 send a command to OR gate 9 thereby activating warning device 12 and also send a command for a stop signal to gate 8 which sends ground via line 110 to solenoid 10F in circuit breaker 10 thereby causing 10A's connection to 10B to be broken and 10A to ground on 10C. A stop signal is also sent to the output of the control signal of amplifier 5.

(3) Testing of Circuits When Failure Occurs in the Main Power Source

When a failure occurs in the main power source circuit, for example in the circuit breaker or the like, such as when a relay terminal is disconnected or a main power source circuit 10D or 10C is broken, single test pulses A sent to individual circuits do not pick this up and the general level of voltage drop occurring with each of these individual pulses is not such as to cause voltage monitoring circuit 7 to note a low voltage condition, therefore this failure of the main power source cannot be found by this test alone.

However, by supplying the synchro test pulses B to a plurality of the electromagnetic valves 11A . . . 11N increases the electric current passing through line 107 to these valves. This higher current coupled with the failure condition in the main power source is enough to cause a voltage drop which reaches the detection threshold of the low voltage detector 7 such that a detection signal is sent to the failure detection circuit 6 which in turn signals logic controls 3 and 4 to send activation signal to control gate 9 to activate warning means 12 and to send a signal to control gate 8 to trip power source breaker 10.

Figure 3:
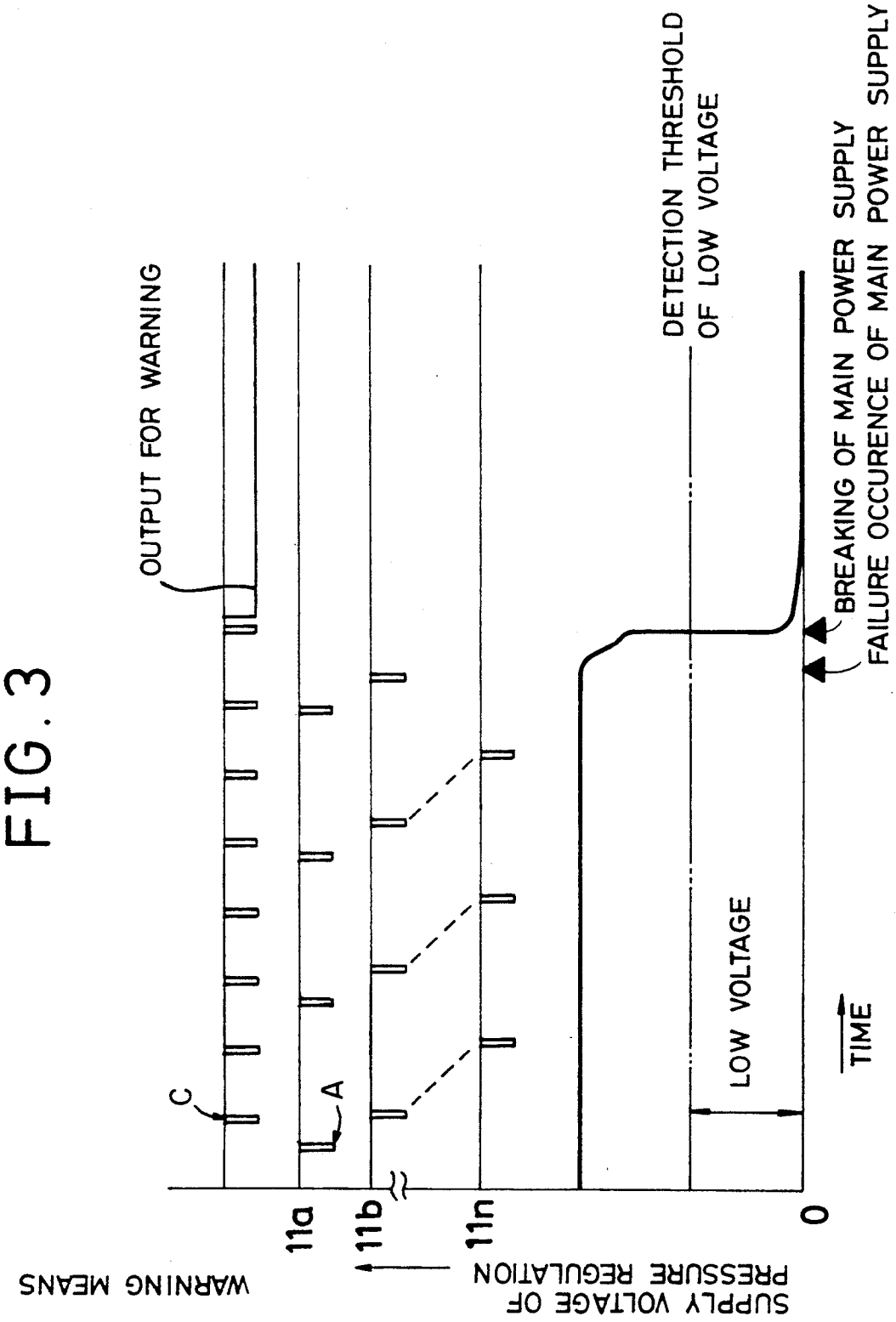
FIG. 3 is a timing diagram graphing the occurrence of test pulses and the resulting voltage observed at the main power source circuit breaker in an anti-lock braking system which includes an alternative embodiment of the failure detection circuit of the present invention.

The embodiment described above detects a failure in the main power source by imposing an increased load across the voltage monitoring circuit by simultaneously applying test pulses to a plurality of electromagnetic valves 11A . . . 11N. This causes a cumulation of voltage drop which when applied to a failed main power source gives rise to a drop below the threshold in the voltage monitoring circuit. As shown in FIG. 3, however, an alternate approach is to send a test pulse to the means for warning device 12 as test pulse C. Test pulse C has a maximum operating time that has been arranged so as to not activate warning device 12 in a way as to inform the driver that a warning is occurring. This activating of warning device 12, however, can put a load on power source line 107 such that the voltage drops in line 107 and this can directly cause voltage monitoring circuit 7 to detect a low voltage condition and send a shutdown signal to the system and activate the warning device 12. The length of pulse C should typically range from about 100 microseconds to about 500 microseconds. Pulses should be supplied at intervals substantially longer than that, such as intervals of about 10 milliseconds or the like. An advantage of this mode of operation is that the cycle of test pulse C is shorter than that using the synchro test pulse B. Therefore the failure of the main power supply such as power supply circuit breaker 10 can be found more quickly.

Figure 4:
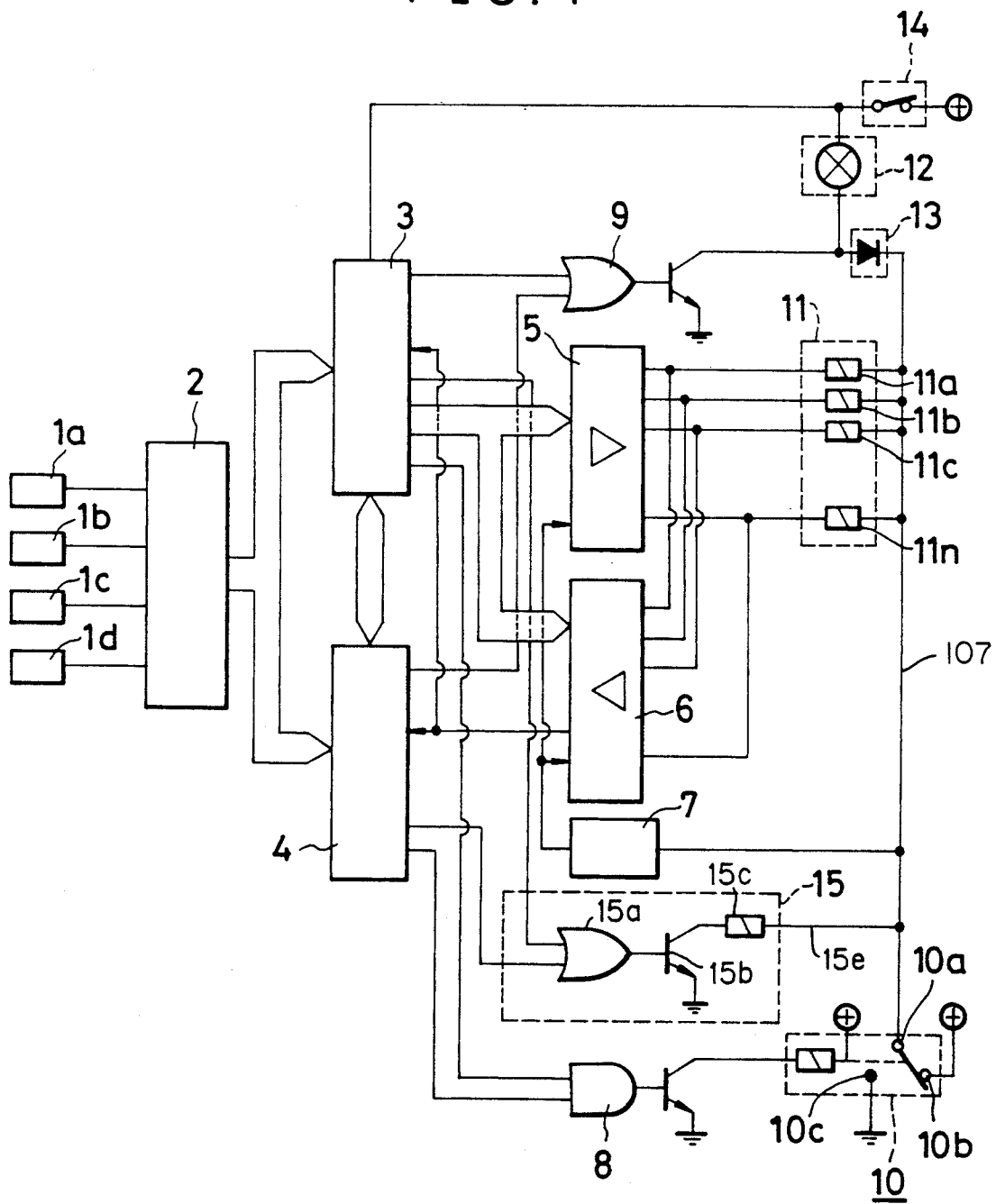
FIG. 4 is a block diagram of an anti-skid braking system which includes yet an additional alternate embodiment of the failure detection circuit of the present invention.

Yet another embodiment of the invention is described with reference to FIG. 4. It will be appreciated that in the other embodiments just described the multiple valves 11A . . . 11N or warning means 12 serve to impose a load on main power source 107. If there has been a failure in the supply of power to line 107 this load causes a voltage drop which exceeds the trigger point for voltage monitoring circuit 7. It is possible, thus, to replace multiple valves 11A . . . 11N or warning means 12 as a load with a load circuit 15. Load circuit 15 includes gate 15A which controls transistor 15B and connects load 15C to ground. This then in turn puts a load on line 107 via line 15E which can give rise to a drop in voltage detectable by voltage detector 7 if there has been a failure in the main power source 10.

The present invention allows the simple and immediate detection of failures in a main power source to an anti-lock brake system. This is carried out by outputting a plurality of synchronized test pulses or by applying a pre-set code via a warning device or a loading circuit. This allows a driver to become immediately aware if failure has occurred in any portion of his anti-lock braking circuit. Another advantage of this invention is that it requires only a change in the output of a group of presently utilized logic circuits. It does not require the addition of substantial additional components the cost and difficulty of which would complicate and make less attractive the use of anti-lock braking systems.

The present invention has been shown and described herein in what is considered to be its most practical and preferred embodiments. It is recognized, however, that departures may be made herefrom which are within the scope of the invention and that obvious modifications will occur to one skilled in the art upon reading this disclosure.

What we claim is:

1. A failure detection circuit for the main electrical power circuit in an anti-skid braking system comprising:
   (a) an electrical power source;
   (b) a plurality of solenoid valves, each solenoid having a power lead and a ground lead;
   (c) a common terminal which connects the power lead of each of the plurality of solenoid valves with one another;
   (d) a logic circuit for controlling current which flows from the common terminal to ground through each of the solenoid valves;
   (e) a main electrical power circuit connected between the electrical power source and the common terminal for feeding electrical power to the solenoid valves;
   (f) a voltage monitoring circuit for detecting drops in voltage below a given threshold voltage value in the common terminal;
   (g) a serial circuit of a lamp, and a diode connected between the electrical power source and the common terminal, the diode preventing current from flowing from the common terminal to the lamp; and
   (h) a switching circuit connected between the common terminal side of the lamp and ground;
   wherein current flows from the electrical power source to ground through the lamp at once when the switching circuit shuts and open by using a pulse signal thereby reducing the voltage in the common terminal and permitting the voltage monitoring circuit to detect a drop in voltage below the given threshold voltage value when the main electrical power circuit fails.

* * * * *